(12) United States Patent
Ritter et al.

(10) Patent No.: US 7,428,744 B1
(45) Date of Patent: Sep. 23, 2008

(54) METHOD AND DEVICE FOR DETECTING DATA CONCERNING THE VIEWING OF VIDEO INFORMATION AND THE RELAYING OF THIS INFORMATION TO A CENTRAL DATA PROCESSING INSTALLATION

(75) Inventors: Rudolf Ritter, Zollikofen (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/926,774

(22) PCT Filed: Jun. 18, 1999

(86) PCT No.: PCT/CH99/00268

§ 371 (c)(1),
(2), (4) Date: Dec. 18, 2001

(87) PCT Pub. No.: WO00/79715

PCT Pub. Date: Dec. 28, 2000

(51) Int. Cl.
*H04H 9/00* (2006.01)
*H04N 7/16* (2006.01)

(52) U.S. Cl. .............................. 725/10; 725/12; 725/123

(58) Field of Classification Search ................ 725/9–14, 725/120–123
See application file for complete search history.

(56) References Cited

U.S. PATENT DOCUMENTS 4,075,657 A    2/1978  Weinblatt
4,513,317 A    4/1985  Ruoff, Jr.
4,605,959 A    8/1986  Colbaugh
4,912,552 A    3/1990  Allison, III et al.
5,374,951 A   12/1994  Welsh
5,382,970 A *  1/1995  Kiefl ........................... 455/2.01
5,596,339 A *  1/1997  Furness et al. ................... 345/8
5,703,637 A * 12/1997  Miyazaki et al. ............... 348/53
6,577,329 B1* 6/2003  Flickner et al. ............. 715/774

FOREIGN PATENT DOCUMENTS

| EP | 0 240 336 | 10/1987 |
| EP | 0 333 570 | 9/1989 |
| EP | 0 382 996 | 8/1990 |
| FR | 2 724 803 | 3/1996 |
| JP | 10-304335 | 11/1998 |
| WO | WO 90/02453 | * 2/1990 |
| WO | 90 02453 | 3/1990 |
| WO | WO 94/09472 | 4/1994 |

* cited by examiner

*Primary Examiner*—Ngoc K Vu
(74) *Attorney, Agent, or Firm*—Oblon, Spivak,. McClelland, Maier & Neustadt, P.C.

(57) ABSTRACT

Method, device and system for capturing and processing viewing data, which viewing data relates to the viewing behavior of users when viewing video data. Data about lines of sight of a user relative to the viewed video data are determined by projecting video data directly on the retina of the user and current eye positions of the user being thereby determined, which are transmitted by a telecommunications network to a central unit for further processing. In the further processing current eye positions are compared with predefined values, and predefined actions are triggered on the basis of the result of this comparison and/or the viewing data being stored in the central unit, and, for example later, being evaluated statistically.

Figure 1:
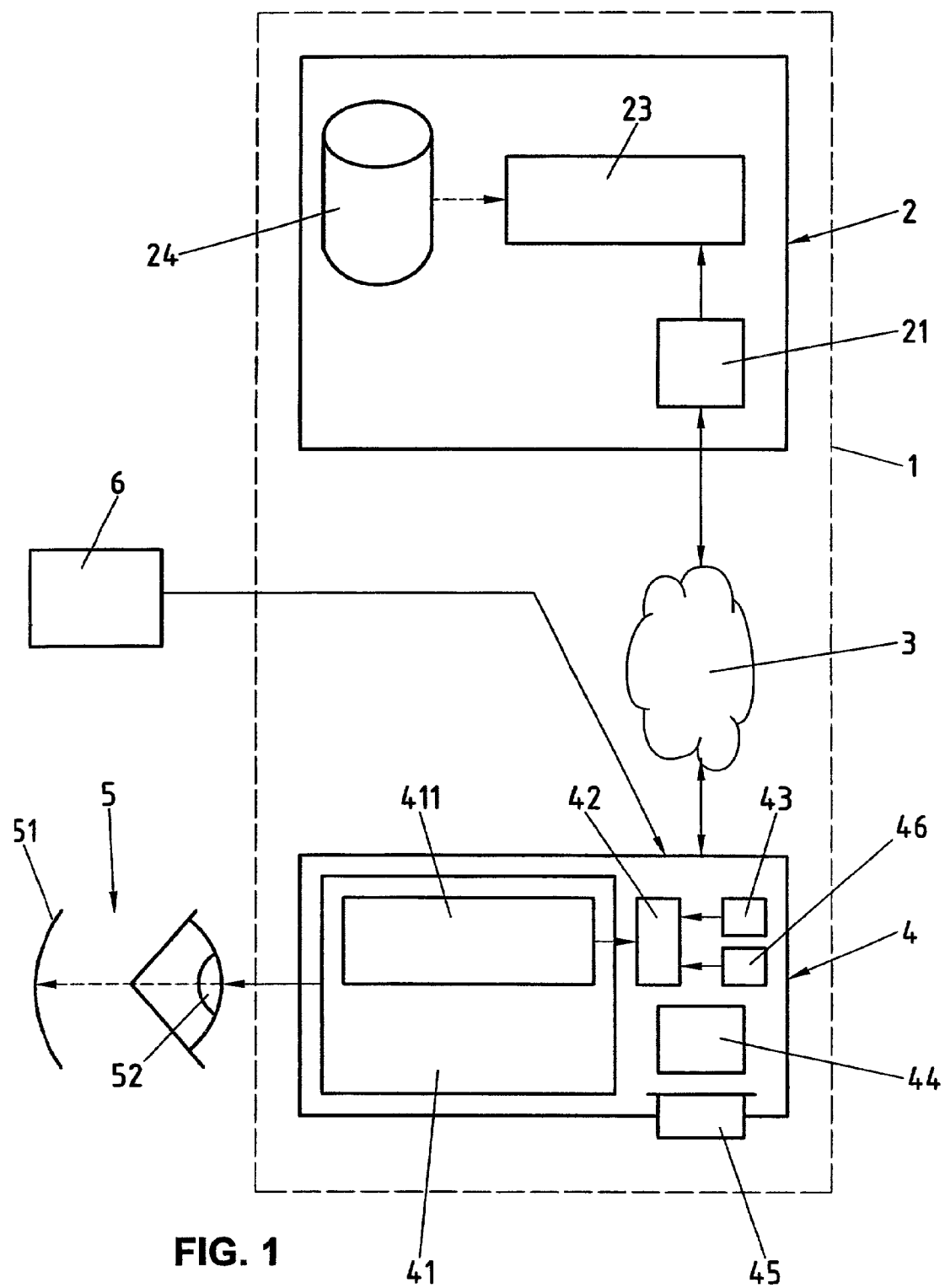

13 Claims, 1 Drawing Sheet ous to:
METHOD AND DEVICE FOR DETECTING DATA CONCERNING THE VIEWING OF VIDEO INFORMATION AND THE RELAYING OF THIS INFORMATION TO A CENTRAL DATA PROCESSING INSTALLATION This invention relates to a method and a device for capturing and processing of viewing data. In particular, this invention relates to a method and a device for capturing and processing of viewing data that concern the viewing behavior of users when viewing video data.

The viewing behavior of television viewers is statistically recorded and evaluated today, particularly for marketing purposes, on the one hand to find out which programs, or respectively which channels, are watched by whom and how often, and on the other hand to obtain a qualitative assessment from registered television viewers of the program watched. A mobile data logging device which, for purposes of market research, monitors and logs the use of a television set by a user has been described in the patent application WO 94/15417 A. Conventional data logging devices and methods are not suitable, however, for capturing the viewing behavior of users on the picture level, i.e. to record statistically the viewing behavior of individuals and/or groups when viewing concrete moving and/or still video data.

Described in the patent application WO 90/02453 is a system and a method for monitoring television viewers. According to WO 90/02453, light beams that are reflected by the eyes of a viewer, located within a defined visual range in front of a television set, are registered by means of a suitable receiver, which is positioned on the television set, for example. In the receiver it is determined on the basis of the registered reflected light beams whether the respective viewer is looking at the television screen. According to WO 90/02453, data about the viewing time and the selected television channel are stored and are transmitted via the telephone network to a central unit. The system according to WO 90/02453 is limited to the registration of a viewer within a defined visual range, and can only detect whether the screen is being looked at by the viewer; thus no indications about picture regions or picture objects, looked at by the viewer on the television screen, are possible.

It is an object of this invention to propose a new and better method, a new and better device as well as a new and better system for capturing and processing viewing data that make it possible to capture the viewing behavior of users when viewing video data.

This object is achieved according to the invention in particular through the elements of the independent claims. Further advantageous embodiments follow moreover from the dependent claims and from the description. This object is achieved through the present invention in particular in that when viewing video data, for example still or moving pictures from transmitted television programs, reproduced, stored video sequences, pictures or graphics, data about lines of sight of a user relative to the viewed video data are determined in that the video data are projected through a virtual retinal display device directly onto the retina of the user and current eye positions of the user are determined, and the viewing data, which contain at least these data about lines of sight, are transmitted to an evaluation unit, for instance to a central unit via a telecommunications network. This has the advantage that lines of sight of a user relative to viewed video data can be determined without it being thereby necessary to also take into account horizontal or vertical head movements of the user. Made possible moreover is for viewing data about users' viewing habits when watching video data to be captured centrally, in particular data about which picture segments of reproduced video data are looked at. The recorded viewing data are then available in the central unit for further evaluation; they can also be used, however, for starting and/or controlling interactive processes, particularly on the level of individual users, such as dialogues for surveys or product orders, for instance.

In a preferred embodiment variant, current eye positions are compared with predefined values, for instance in the device with the display or in the central unit, and, on the basis of the result of this comparison, predefined actions are triggered, for instance in the device with the display or in the central unit, e.g. order procedures or the transmission of information, in particular video data. This has the advantage that graphic user interfaces can thereby be achieved which can be controlled by the user, without using his hands, through positioning of his eyes.

In an embodiment variant, the viewing data transmitted to the central unit include user identification data, which originate for instance from identification modules, e.g. from SIM cards (Subscriber Identification Module), that are each assigned to the users. This makes it possible for evaluation and use of captured viewing data to be carried out on the level of individual users, as described above, or for additional known information about respective users to be taken into consideration in the evaluation and further use of captured viewing data.

In an embodiment variant, the viewing data transmitted to the central unit include video identification data. This is especially advantageous when the source of the video data and the central unit for capturing the viewing data are not implemented together, so that captured viewing data can be associated with the respective video data during their evaluation and further processing.

In an embodiment variant, the viewing data transmitted to the central unit include time indications. Depending upon the type of video data, for instance in the case of transmission of video data by television program, time indications can be used to assign captured viewing data to the respective video data, for their evaluation and further use.

The captured and transmitted viewing data are preferably stored in the central unit, for example in a viewing database, whereby the viewing data can also be made available at later points in time, in particular for statistical evaluations.

In an embodiment variant, the above-mentioned telecommunications network is a mobile radio network, for example a GSM or UMTS network or another, for instance satellite-based, mobile radio network. This has the advantage that the capturing of individual viewing data when viewing video data can be carried out in a mobile way, independently of fixed network connections.

An embodiment of the present invention will be described in the following with reference to an example. The example of the embodiment is illustrated by the following sole attached FIGURE:

FIG. 1 shows a block diagram of the system, which block diagram presents schematically a central unit that is connected, via a telecommunications network, to a device, in particular a communications terminal, which communications terminal comprises a video display device that projects video data onto the retina of an eye and which includes an eye position detection module that determines current eye positions of a user.

Reference numeral 4 in FIG. 1 refers to a device, in particular a communications terminal, for example a fixed-installed communications terminal 4, e.g. a telephone or a communication-capable personal computer that is able to exchange data with a central unit 2, over a fixed network 3, for example a public switched telephone network, an ISDN network (Integrated Services Digital Network), an IP-based network (Internet Protocol), or a WAN (Wide Area Network) or LAN (Local Area Network), or a mobile communications terminal 4, i.e. a mobile device 4, for example a mobile radio telephone or a communication-capable laptop or palmtop computer, which is able to exchange data with a central unit 2 via a mobile radio network, for instance a GSM or UMTS network, or another, for instance satellite-based, mobile radio network, for example with the aid of SMS messages (Short Message Services), USSD messages (Unstructured Supplementary Services Data), GPRS services (Generalized Packet Radio Service), or according to another suitable protocol, via the user information channel.

The central unit 2 is based, for example, on a commercially available communications server having a communications module 21 with the necessary hardware and software components to communicate with the communications terminals 4 via the telecommunications network 3. The central unit 2 is directly connected to the telecommunications network 3, or is connected via suitable network elements, for instance a Mobile Switching Station (MSC), and includes a database 24 that is implemented on the same, or on a separate, computer.

As shown in FIG. 1, the communications terminal 4 includes a video display device 41 which reproduces video data through projection of corresponding picture signals onto the retina 51 of the eye 5 of the user of the communications terminal 4. The video data are, for example, still or moving pictures of transmitted television programs or reproduced, stored video sequences, pictures, or graphics, that are obtained from, or respectively supplied by, the central unit 2 or another video source 6 connected to the communications terminal 4 via a video interface with contacts, for instance a television receiver, a video playback device, for example a video cassette recorder, or a reproduction device for digital video data stored on data carriers.

A video display device 41, which can project picture signals directly onto the retina 51 of a viewer, a so-called virtual retinal display device (Virtual Retinal Display, VRD) has been described in the patent applications WO 94/09472 and WO 97/37339. These virtual retinal display devices can be supplied with video data via a video interface, for instance in the form of an RGB signal, an NTSC signal, a VGA signal or another formatted color or monochrome video or graphics signal. One skilled in the art will understand that it can be advantageous to adapt the virtual retinal display device described in the mentioned patent publications WO 94/09472 and WO 97/37339, or the video interface described there, in such a way that it is also able to receive efficiently other formats of television signals and in particular digital video data. By means of an interface module (not shown), television signals and video data can also be suitably adapted to the video interface, or respectively obtained video data can be converted such that they are able to be applied to the video interface.

The video display device 41 and the further components of the communications terminal 41 can be implemented in a common or separate housings, the video display device 41 being connected in a first housing via a wired or via a wireless interface to components in the second housing, for instance.

As shown schematically in FIG. 1, the video display device 41 includes an eye position tracking module 411, which determines current eye positions of the user when viewing video data and is able to transmit them, via the above-mentioned, or an additional, wired or wireless interface, to a feedback module 42 of the communications terminal 4. An eye position tracking module (eye tracker) which determines current eye positions based on the position of the pupil 52 of a user, has also been described in the above-mentioned patent application WO 94/09472, and can be extended by one skilled in the art such that the determined eye position is available for components outside the video display device 41 via a suitable interface; depending upon the embodiment, values for both eyes can be made available.

The feedback module 42 of the communications terminal 4, for example a programmed software module that is executed on a processor of the communications terminal 4, transmits determined current eye positions of the user, if applicable together with other viewing data, to an evaluation unit, for instance a programmed software module in the communications terminal 4, or in particular with the aid of communications services of the communications terminal 4, over the telecommunications network 3 to the central unit 2. In the central unit 2, the transmitted viewing data with the current eye positions are received by the communications module 21 and are sent to the processing module 23.

Depending upon the embodiment variant and application, the communications terminal 4 includes further modules 43, 44, 45, 46 which contribute data to the viewing data.

The time determining module 43 determines the current time, and transmits the determined current time to the feedback module 42, from where it is transmitted to the central unit 2 together with the determined current eye positions in the viewing data. Besides establishing the point in time of the determined eye positions, the time indication can also be used to identify the video data viewed at this point in time, for instance if the television channel watched at this point in time is known.

The input module 44 makes it possible for a user to enter user data and to transmit these data to the central unit 2, by means of the feedback module 42, together with the viewing data or separately. User data are, for example, qualitative data, e.g. a number from an evaluation scale or instructions or responses, which are transmitted to the central unit 2. The input module 44 includes, for example, operating elements and correspondingly programmed software functions which are able to receive user data entered by means of the operating elements. The input module, however, can also be a programmed software module which transmits determined current eye positions to the central unit 2 as user data, for instance at specified times or in response to predefined signals or instructions which are transmitted from the video source 6 or the central unit 2 to the communications terminal 4, or, in the function of the above-mentioned evaluation unit, compares determined current eye positions with predefined position values or with position values that are transmitted from the video source 6 or the central unit 2 to the communications terminal 4, and, on the basis of this comparison, carries out operations corresponding to the position values, initiates actions, and/or transmits instructions, responses or evaluations as user data to the central unit 2. The comparison operation can also be carried out in the central unit 2, which will be explained more closely later. Such an input module 44 therefore makes it possible to use the virtual retinal display device 41, or respectively the communications terminal 4 with the virtual retinal display 41, as graphic user interface, which can be controlled by the user through positioning his eyes in that, by means of the virtual retinal display device, GUI objects (Graphical User Interface), corresponding to the position values, in the picture regions are projected onto the retina of the user. Corresponding video data for such a graphic user interface can also be transmitted, for instance, by the central unit 2 to the communications terminal 4.

The identification module 45, for example an SIM card (Subscriber Identification Module) contains user identification data, for example an IMSI (International Mobile Subscriber Identity) and/or a personal biometric code, or key, which can be transmitted to the central unit 2 by the feedback module 42 together with other viewing data. This is especially useful when viewing data are further processed or evaluated in the central unit 2 on an individual user level, or when, in the central unit 2, additional user-specific data, for instance name and address information from a subscriber database, are brought in for further processing of the viewing data.

The video identification module 46, for example a programmed software module, determines video identification data for current video data, for instance the relevant television channel, the title of a video with the current sequence number of the current video frame or other indications, and passes on the determined video identification data to the feedback module 42 for transmission to the central unit 2 with other viewing data.

Through the processing module 23 of the central unit 2, for example a programmed software module, the received viewing data are evaluated and/or stored in a viewing database 24. An immediate evaluation of the received viewing data in the processing module 23 makes sense especially when predefined actions are supposed to be triggered on the basis of the current eye positions contained therein. For example, the communications terminal 4 with the virtual retinal display device 41 can be used, as mentioned above, as graphic user interface that is controlled by the user through eye positioning. In this way eye positions corresponding to a predefined picture region of the reproduced video data can trigger actions in the central unit 2. For example, a products and/or services ordering method can be initiated by the processing module 23, or information, in particular video data, can be transmitted via the telecommunications network 3 to the communications terminal 4 for reproduction via the display device 41, whereby in particular GUI applications of the client/server type can also be achieved. Stored viewing data can also be evaluated statistically, for instance at a later point in time. For example, which and how many viewers have viewed, or respectively have not viewed, particular picture regions of reproduced video data can be studied, which can be of interest for the evaluation of advertising films, for instance. In a further variant, in evaluating the eye positions, the processing module 23 can also take into account identified picture objects contained in the video data, so that the correlation of the eye positions with these identified objects can be studied. To carry out this last variant, it can be advantageous, for example, to analyze respective video data in advance with suitable image processing means such that their pictorial content can be described in abstract form, for instance through object designations, vectors and/or data on coordinates. Such abstract content descriptions can be stored in the database 24, for instance together with the respective video data, and can be supplied to the processing module 23. Captured viewing data can also be stored, for instance user-specifically, as a user profile, and made further use of.

It should be explicitly stated here that, in the device 4, the virtual retinal display device 41 together with the input module 44 in the function of an evaluation unit can be used as GUI user interface without data having to be exchanged thereby with the central unit 2, which has the advantage that the device 4 can be controlled without use of other operating elements or the hands of a user, which can also be of interest in particular for non-communication-capable computers.

Complete devices 4, as described, in particular communications terminals 4, can be sold or leased to an interested user. It can also be of commercial interest to sell expansion sets that include the necessary components to extend a conventional device, in particular a conventional communications terminal, into a described device 4, in particular a described communications terminal 4, which expansion sets also include in particular a data carrier with programmed feedback module 42, programmed input module 44, programmed video identification module 46 stored thereon and, if applicable, a time determining module 43. Whole systems can also be offered under license to interested operators, or data carriers can be sold to them containing a programmed communications module 21, processing module 23, and, if applicable, a viewing database 24 to operate a conventional communications server, which includes the hardware components needed by the communications module 21, as the described central unit 2.

What is claimed is:

1. A method for capturing and processing viewing data, wherein the viewing data relate to a viewing behavior of a user when viewing video data, and the viewing data are transmitted via a telecommunications network to a central unit, configured to process the viewing data, the method comprising:
    projecting the video data directly on a retina of the user via a virtual retinal display device;
    determining, during the projecting, data about lines of sight of the user relative to the viewed video data by determining current eye positions of the user by means of an eye position detection module of the virtual retinal display device;
    transmitting the viewing data to the central unit, the viewing data including at least the data about lines of sight relative to the viewed video data; and
    determining, by the central unit based on the viewing data, picture regions of a single picture, which is part of the viewed video data; and
    determining, by the central unit, a correlation of the lines of sight with picture objects contained in the video data, based on the data about lines of sight of the user relative to the viewed video data, and based on stored pictorial content descriptions including object designations and locations.

2. The method according to claim 1, further comprising:
    comparing the current eye positions with predefined values, and
    triggering predefined actions based on a result of the comparing.

3. The method according to claim 1, wherein the viewing data are stored in the central unit.

4. The method according to claim 1, wherein the viewing data include user identification data.

5. The method according to claim 1, wherein the viewing data include video identification data.

6. The method according to claim 1, wherein the viewing data include time indications.

7. The method according to claim 1, wherein the telecommunications network is a mobile radio network.

8. A system, comprising:
    a central unit connected via a telecommunications network to a device, the device configured to capture and process viewing data, wherein the viewing data relate to a viewing behavior of a user when viewing video data, and the video data reproduced via a display device of the device, the device including a feedback module, wherein
    the display device is a virtual retinal display device configured to project the video data directly on a retina of the user, the virtual retinal display device includes an eye position detection module configured to determine data about lines of sight of the user relative to the viewed video data by determining current eye positions of the user during projection of the video data, the feedback module is configured to transmit the viewing data via the telecommunications network to the central unit, the viewing data including at least the data about lines of sight of the user relative to the viewed video data, for determining, based on the viewing data, picture regions of a single picture, which is part of the reproduced video data that have been viewed by the users and the central unit is configured to determine a correlation of the lines of sight with picture objects contained in the video data, based on the data about lines of sight of the user relative to the viewed video data, and based on stored pictorial content descriptions including object designations and locations.

9. The system according to claim 8, wherein the device includes means for comparing the current eye positions with predefined values, and means for triggering predefined actions based on a result of this comparison by the means for comparing.

10. The system according to claim 8, wherein the device includes an identification module, configured to be assigned to the user, the identification module including user identification data, and the viewing data include the user identification data.

11. The system according to claim 8, wherein the device includes a video identification module configured to determine video identification data associated with the video data, and the viewing data include the video identification data.

12. The system according to claim 8, wherein the device includes a time determining module configured to determine a current time, and the viewing data include time indications.

13. The system according to claim 8, wherein the device is designed as a mobile device, the telecommunications network is a mobile radio network, and the device is configured to communicate via the mobile radio network.

* * * * *